United States Patent Office 2,951,766
Patented Sept. 6, 1960

2,951,766
ANTISEPTIC PLASTIC

Le Roy A. White, Hazardville, Conn.
(Root Road, Somers, Conn.)

No Drawing. Filed July 15, 1957, Ser. No. 671,689

11 Claims. (Cl. 106—15)

This invention is concerned with a solid rigid material which when treated with an antiseptic, and upon contact with moisture or water, releases the antiseptic from the material.

This application is a continuation in part of a parent application filed on September 8, 1956, Ser. No. 612,580, now abandoned.

Many communicable diseases and harmful bacteria are transmitted from one person to another who come in contact or proximity with certain commonly used objects such as telephone mouthpieces, toilet seats, flushing mechanisms, medical and surgical items, door knobs, railings, pens and pencils located in public banks, libraries and similar institutions, steering wheels, baby high chairs located in restaurants, counter tops and table tops in public eating places and the like.

It is a principal object of the within invention to provide a synthetic material containing chemicals including antiseptics that are soluble in water and that are effective against most types of viruses and bacteria.

It is an additional object of this invention to provide a plastic material that allows antiseptics to escape therefrom upon contact with moisture for sterilization purposes.

It is yet another object of the within invention to use an antiseptic and plastic material so that they will not react with each other, but which will remain in a dormant or inactive state until set into motion by predetermined stimuli.

These and other objects are obtained by the use of a water soluble bacteria killing antiseptic dissolved or dispersed in a hydrophilic plastic material mixture that does not chemically react with the antiseptic.

Certain chemicals may be added to assist in the adhesion of the mixture to metals, wood and the like, to impart toughness and other desirable properties, as well as to prevent the release of the antiseptic until there is a contact with water. This mixture may be dissolved in a suitable solvent and applied by dipping, painting or spraying to the surface of the desired device such as for example, a telephone mouthpiece. The composition may also be employed in the form of a molding powder and molded in conventional plastic processing equipment. When the saliva or moisture from a person contacts the composition, the antiseptic is released, killing the germs and bacteria.

Reference is now made to the following detailed description:

THE ANTISEPTIC

Any antiseptic soluble or slightly soluble in water is suitable to carry out the objects of this invention. It is preferable, however, to employ those antiseptics which are slightly soluble in water because they remain in the plastic for a longer period of time, giving a longer effective life to their purpose. It is also essential that the antiseptics or combinations of antiseptics be effective against most types of germs. The preferred antiseptic is:

(1) Iodine dissolved or dispersed in the hydrophilic plastic. Said iodine may be employed in its purely elemental form ($I_2$) or complexed with solubilizing agents, i.e. sodium iodide, polyvinyl pyrrolidone, or surface-active agents.

Other effective materials are:

(2) Phenyl arsenicals, compounds in this class include, but are not limited by:

(a) Phenyl arsenoxide $C_6H_6AsO$
(b) Dithioglycolyl phenyl thioarsinite $$C_6HAs(SCH_2CO_2Na)_2$$

(c) 4-methoxyphenyl arsenoxide $CH_3OC_6H_6AsO$
(d) 4-thiomethylphenyl arsenoxide $CH_3SC_6H_6AsO$
(e) 4-acetophenone arsenoxide $CH_3COC_6H_4AsO$
(f) Arsphenamine HO—⟨⟩—As=As—⟨⟩—OH
   NH₂              NH₂

(3) Mercury salts i.e. $HgCl_2$
(4) Phenyl mercury compounds including, but not limited by:

(a) Phenyl Mercuric salicylate
(b) Phenyl Mercuric phthalate
(c) Phenyl Mercuric chloride
(d) Mercurochrome (Merbromin)
(e) Mercurophen (sodium hydroxymercuri-o-nitro-phenolate)

(5) Phenyl silver compounds including:

(a) Silberol (silver phenolsulfonate)
(b) Silver picrate

*Surface-active disinfectants.*—The bactericidal action of ionic surface-active agents is believed due principally to the ability of the agent to be absorbed on the surface of the bacteria where it disorganizes the cytoplasmic membrane in some way, making the membrane more permeable to solutes. There are two classes of ionic surface-active materials; cationic and anionic.

(6) Cationic bactericides useful to this invention include compositions of the general formula:

(A) $$R-\underset{M'}{\overset{M}{X^+}}-R'Z^-$$

where

X is nitrogen, phosphorus or arsenic
M and M' are hydrogen, methyl, or ethyl groups
R' is hydrogen, methyl, ethyl, propyl, butyl or benzyl
R is a hydrocarbon containing 8 to 18 carbon atoms
$Z^-$ is an anion The anion accompanying the above may be sulfate, chloride, bromide, or phosphate. Compounds in this class include, but are not limited by:

(1) Octadecyl amine hydrochloride
(2) Hexadecyl dimethyl propyl ammonium chloride
(3) Dodecyl dimethyl benzyl ammonium chloride
(4) Octadecyl dimethyl benzyl ammonium chloride
(5) Cetyl trimethyl ammonium bromide
(6) Dodecyl benzyl diethyl ethanol ammonium chloride
(7) P-diisobutyl phenoxy ethoxy ethyl dimethyl benzyl ammonium chloride (8)
```
         N———CH
         ‖    |  (Cl)⁻
      R—C    CH₂
          \  /
           N⁺
          / \
    HOCH₂CH₂  CH₂CH₂CH₂CH₂Cl
```

(B) Fatty amides of the formula: $C_nH_{2n+1}CONRR'$, where R is hydrogen or $CH_2CH_2N(C_2H_5)_2$, $n=10-22$, and R' is hydrogen, methyl, or ethyl (very similar to the above cationic compounds and effective for the purposes of this invention).

In this same cationic classification are:

(C) Acridine dyes of the general formula

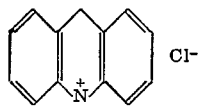

Examples include, but are not limited by:

(1) Proflavine (3,6 diamino acridinium dihydro chloride)
(2) Euflavine (2,8, diamino, 10 methyl acridinium chloride)
(3) 3 chloro, 5 amino acridinium chloride
(4) 2 nitro, 5 amino acridinium chloride
(5) 1 methyl, 5 amino acridinium chloride (D) Tri phenyl methane dyes

GENERAL STRUCTURE

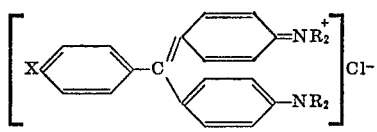

where X is hydrogen, amine, methyl amine or dimethyl amine, $NR_2$ is amine, methyl or ethyl amine, dimethyl or diethyl amine.

Examples include, but are not limited by:

(1) p-Ros aniline
(2) Brilliant green
(3) Malachite green
(4) Crystal violet (7) Anionic surface-active agents useful in this invention are:

(A) Phenols (compounds containing one or more hydroxyl groups attached to a benzene ring)

where R is hydrogen or $CH_3(CH_2)_n$ and $n$ is 0–12, X, Y, and Z may be hydrogen, hydroxyl or halogen, W is hydrogen, aklyl, hydroxyl or halogen.

Compounds in this class include, but are not limited by:

bis 2,2' methylene bis (4-chlorophenol)
2,4,6 chlorophenol
o-Octyl p-chlorophenol
4-n-nonyl resorcinol
p-n-hexyl phenol (B) Sulfonated surface-active agents:
Compositions in this class include, but are not limited by:

Sodium lauryl sulfate
Bis (2-ethylhexyl) sodium sulfosuccinate
Sodium dodecyl benzene sulfonate The addition of an alkaline buffering agent, such as disodium phosphate mitigates the lessening of bactericidal activity caused by atmospheric carbon dioxide.

(8) Antibiotics (chemical substances of microbial origin which interfere with the growth of metabolic activities of other microorganisms).

Compounds in this class include but are not limited by:

(a) Penicillins—compounds of the structure

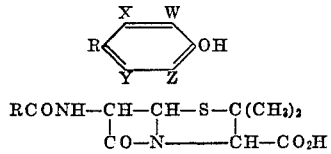

$$RCONH-CH-CH-S-C(CH_3)_2$$
$$\phantom{RCONH-CH-}CO-N\phantom{-----}CH-CO_2H$$

where R is a hydrocarbon, or phenolic, and the carboxyl may be reacted with a metal, ammonia or an amine to form a salt.

(b) Streptomycin $C_{21}H_{39}N_7O_{12}$ and derivatives
(c) Chloromycetin $C_{11}H_{12}Cl_2N_2O_5$ and derivatives
(d) Auromycin $C_{22}H_{23}ClN_2O_8$ and derivatives
(e) Terramycin $C_{22}H_{24-26}N_2O_9$ and derivatives
(f) Bacitracin
(g) Gramicidin
(h) Patulin $C_7H_6O_4$
(i) Puberulic acid $C_8H_6O_6$
(j) Mellein $C_{10}H_{10}O_3$
(k) Tardin $C_{11}H_{15}O_3$
(l) Citrinin $C_{13}H_{14}O_5$
(m) Phoenicin $C_{14}H_{10}O_6$
(n) Javanicin $C_{15}H_{14}O_6$
(o) Fuscin $C_{15}H_{16}O_5$
(p) Hirsutic acid $C_{15}H_{20}O_4$
(q) Marasmic acid $C_{16}H_{20}O_4$
(r) Herquein $C_{19}H_{20}O_8$
(s) Iodinin $C_{12}H_8N_2O_4$
(t) Aspergillic acid $C_{12}H_{20}N_2O_2$
(u) Pyocyanine $C_{13}H_{10}N_2O$
(v) Prodigiosin $C_{20}H_{25}N_3O$
(w) Streptothricin $C_{20}H_{34-36}N_8O_9$
(x) Amreothricin $C_{13}H_{13}N_3S_3O_3$
(y) Neomycin A
(z) Viomycin (9) Pyrimidine derivatives Synthetic compounds believed to be similar to antibiotics in germicidal action:

An effective pyrimidine compound is: (1,3-bis-B-ethylhexyl)-5-methyl-5-aminohexahydropyrimidine

THE PLASTIC MATERIAL

The plastic materials that were found to be most effective and compatible with the antiseptics are compounds containing a high percentage of the hydrophilic groups. Some of these are: hydroxyls, methoxyls, amides, amines, acids and polyethers. These polymers, it is to be noted, are water or alcohol-water soluble materials unless crosslinking agents are added.

GROUP I—HYDROXYLS

In this group are polymers containing 5 to 47% by weight hydroxyl groups (—OH).

Examples of such compounds include but are not limited by:

| | Weight percent OH |
|---|---|
| 99% polyvinyl alcohol | 39 |
| 50% hydrolyzed polyvinyl acetate | 13.0 |
| 50% reacted vinyl alcohol-formal | 18.0 |
| Gum arabic | 46 |
| Hydrolyzed cellulose acetate (25% mol percent acetate) | 18.6 |
| Polyhexamethylene diamine - adipamide - 60% of amide reacted with ethyleneoxide | 7.2 |
| 40% ethylated ethyl cellulose | 14.8 |
| 42% ethylated 17% hydroxyethylated cellulose | 12.2 |

GROUP II—METHOXYLS

In this group are polymers containing 15–45% by weight methoxyl groups (—OCH).

Examples of such compounds include but are not limited by:

| | Percent methoxyl |
|---|---|
| Methyl cellulose | 29 |
| Polyhexamethylene adipamide—45% of amide reacted with formaldehyde-methanol | 10.5 |

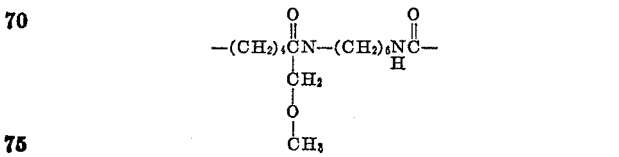

GROUP III—AMIDES

In this group are polymers containing 20–70% by weight of the amide group $$(-\overset{O}{\underset{|}{\overset{\|}{C}}}-\overset{}{\underset{|}{N}}-)$$

Examples of such compounds include but are not limited by:

| | Percent $-\overset{O}{\underset{|}{\overset{\|}{C}}}-\overset{}{\underset{|}{N}}-$ |
|---|---|
| Polyacrylamide | 64 |
| Gelatin | Approx. 60 |
| Polyvinylpyrrolidone | 38 |

GROUP IV—AMINES

In this group are polymers containing 5–40% by weight nitrogen in the form of $$\underset{R''}{R'NR}$$

where R' is the polymer chain
where R is a continuation of the polymer chain, hydrogen or $C_nH_{2n+1}$
where R'' is hydrogen or $C_nH_{2n+1}$
where $n$ is less than 18

Examples of such compounds include but are not limited by:

| | Percent nitrogen |
|---|---|
| Polyethylene imine $-(CH_2CH_2\overset{N}{\underset{H}{}})-$ | 32.7 |
| Tetraethylene pentamine-formaldehyde polymer | 35 |
| Polyvinyl pyridine | 12.5 |
| N,N,-diethylaminoethyl polymethacrylate | 8.2 |

GROUP V—ACIDS

In this group are polymers containing 10–65% by weight of carboxyl group $$(-\overset{O}{\overset{\|}{C}}OH)$$

sulfate ($-SO_3H$) or phosphate $-PO_3H_2$ in the form of acid or salt.

Examples of such compounds include but are not limited by:

| | Wt. percent acid | |
|---|---|---|
| Polyacrylic acid | 62% | $-CO_2H$ |
| Polymethacrylic acid | 51.5% | $CO_2H$ |
| Vinyl methyl ether mono 2 ethylhexylmaleate 1:1 copolymer | 26.0% | $CO_2H$ |
| Carboxy methyl cellulose 23% of hydroxyls reacted with chloroacetic acid | 15.7% | $CO_2H$ |
| Polystyrene sulfonic acid | 38% | $-SO_3H$ |
| Oxidized cellulose | 25% | $-CO_2H$ |
| B propionic acid polysiloxane | 33% | $-CO_2H$ |

GROUP VI—POLYETHERS

In this group are polymers containing 10–40% oxygen in the form of an ether ($-O-$).
Examples of such compounds include but are not limited by:

| | Percent oxygen |
|---|---|
| Polyethylene glycol (molecular weight 20,000) | 36.4 |
| Polyisopropylene glycol-ethylene glycol 1:1 | 32.9 |

$$-\overset{CH_3}{\underset{|}{CH}}-CH_2OCH_2CH_2O-$$

The lower limits specified for percent of a given hydrophilic grouping apply only in the case where the hydrophilic group in question is the sole hydrophilic group. In cases where two or more hydrophilic groupings are present in the composition, any lower weight percent of specific hydrophilic grouping may be less than the lower limits specified (i.e. 55% reaction product of polyhexamethylene adipamide with formaldehyde-methanol contains only 12.5% Methoxyl and relies heavily on the 30% amide groupings to render the polymer hydrophilic).

Crosslinking of the above groups insures the reduced solubility of the plastic in water or moisture and assures a longer life to the effectiveness of the antiseptic plastic.

*Crosslinking agents.*—Dichromates, formaldehydes and formaldehyde derivatives (these include methylol ureas and melamines, and phenol or resorcinol formaldehyde complexes) may be employed as crosslinking agents for Groups I, III, and IV. Other aldehydes such as acetaldehyde and glyoxal are also effective agents. Dichromates may be used to insolubilize Group V. Diisocyanates are cross-linking agents for Groups I, III, IV, and V and VI. Aluminum isopropyl chelate of ethyl acetoacetate, titanium tetrachloride and titanium tetra-alcoholates (e.g. tetra-isobutoxide) may be used to crosslink Group VI.

SURFACE MODIFICATION METHOD

Certain types of plastics may be modified, particularly those of Groups I and V, by dipping the moulded article into caustic, for example, those articles of manufacture made of methyl methacrylate, polyvinyl acetate and acetate resins. After the caustic has changed the surface to a hydrophilic type, the article should then be immersed in an antiseptic to impregnate the surface so that it will be prepared to release the antiseptic upon contact with water or moisture.

Styrene may be treated with warm concentrated sulfuric acid to render the surface hydrophilic.

Plastics such as nylon will not yield the same surface reactions as aforedescribed. The surface of nylon may be rendered hydrophilic by heating the article with formaldehyde and methanol, or ethylene oxide. Here again it is necessary to impregnate the surface with antiseptics as aforementioned.

Surface treatments also may be used to aid adherence of antiseptic plastic to be applied from solution. Some typical embodiments of this invention are recited hereinafter.

Example #1.—Formulation 3 grams nylon 818 (methnol-formaldehyde-polyhexamethylene adipamide reaction product) (hydrophilic plastic). Source: Belding-Corticelli
48 grams—n-propyl alcohol (solvent)
18 grams—water (solvent)
0.21 gram—Hyamine 1622 (p-diisobutyl phenoxy ethoxy ethyl dimethyl benzyl ammonium chloride). Source: Rohm and Haas (antiseptic)
0.15 gram—citric acid (crosslinking catalyst)

The above is dissolved by mechanical agitation and warming. This solution was coated on a shellacked door knob. The solvent was evaporated at room temperature in 24 hours leaving the residue as a coating. A drop of water applied upon the surface of the door knob caused some of the antiseptic to leach out into the drop.

The same solution was coated on a caustic treated phenolic disc, dried and cured at 120° C. in one-half hour. A drop of water placed upon the surface of the disc caused some of the antiseptic to leach out into the drop. The same solution was coated on a nylon tooth brush bristle; it was dryed at room temperature. Water caused the antiseptic to leach out.

Example #2.—Formulation (Hydrophilic plastic) 3 grams—nylon (818) (Belding Corticelli)
(Stiffening agent) 0.30 gram—polymethyl methacrylate
(Antiseptic) 0.21 gram—iodine
(Solvent) 60 grams—diacetone alcohol The above is dissolved at 150° C. and cast into a film. Water caused the iodine to leach out.

Example #3.—Formulation (Hydrophilic plastic) 3 grams—nylon (818) (Belding Corticelli)
(Non-hydrophilic diluent) 0.5 gram—Perbunan N35 (acrylonitrile rubber)
(Antiseptic) 0.21 gram—iodine
(Solvent) 60 grams—diacetone alcohol The above is dissolved at 150° C. and cast into a film. Application of water on the film caused the iodine to leach out.

Example #4.—Formulation (Hydrophilic plastic) 3 grams—Du Pont polyvinyl alcohol 88% hydrolyzed
(Solvent) 36 grams—isopropyl alcohol
(Solvent) 24 grams—water
(Antiseptic) 0.21 gram—Hyamine 1622

The above is mixed and dissolved with heat and agitation after which it is cast into a film. The application of water on the film causes the hyamine to leach out.

Example #5.—Formulation (Hydrophilic plastic) 3 grams—98% hydrolyzed polyvinyl alcohol
(Crosslinking agent) 0.3 gram—dimethylol urea
(Antiseptic) .15 gram—Iodine
(Solvent) 45 grams—water Polyvinyl alcohol and iodine are dissolved with heat and agitation and then cooled. Glycerine and dimethylol urea (fresh) in solution are added and mixed together.

A polyvinyl acetate coated toilet flush lever was dipped in the solution, dried at 40° C. and cured at 120° C. Application of water caused the iodine to leach out satisfactorily.

Example #6.—Formulation (Hydrophilic plastic) 3 grams—polyvinyl alcohol
(Crosslinking agent) 0.3 gram—melamine-formaldehyde adduct
(Antiseptic) 0.15 gram—iodine
(Solvent) 45 grams—water The above solution casts films which leach iodine satisfactorily but film tends towards brittleness.

Example #7.—Formulation (Hydrophilic plastic) 1 gram—polyacrylamide
(Plasticizer) .05 gram—glycerine
(Solvent) 16 grams—water
(Catalyst) 0.01 gram—triethylamine
(Crosslinking agent) 0.40 gram—formaldehyde The polyacrylamide is dissolved in water. The formaldehyde and triethylamine are added. The mix is heated to 50-60° C. for two hours. Glycerine is added and the solution is cast into a film. The film was soaked in an acidified hyamine solution for ten hours. The application of water to the film causes the Hyamne to leach out satisfactorily.

Example #8.—Formulation (Hydrophilic material) 1 gram—gelatin
(Plasticizer) .05 gram—glycerine
(Antiseptic) .05 gram—Hyamine 1622
(Solvent) 10 grams—water The above is heated to 60° C. The solution was cast into a film. The application of water causes hyamine to leach out.

Example #9.—Formulation 4 grams polymethyl methacrylate
4 grams polyethylene glycol (carbowax 20 M carbide and carbon)
0.15 gram toluene diisocyanate
50 grams ethylene dichloride The mix was dissolved and cast into a film. The film was soaked 6 hours in "Wescodyne" (a commercial water-nonionic emulsifier-iodine solution). The film was washed and dried. A drop of starch water turns blue when placed on the surface of the film for 15 seconds. (Iodine test.)

The compositions in accordance with the present invention can vary within the following proportions:

| | Percent by weight |
|---|---|
| Hydrophilic polymer composition | 50–99.9 |
| Antiseptic | 0.1–50 |

It is to be understood that the above examples are but some of the methods and solutions of carrying out the within invention, and others are within the spirit and scope of this invention.

I claim:

1. An antiseptic plastic coating composition consisting essentially of 50–99.9% by weight of a solution of at least one water insoluble plastic hydrophilic polymer composition, said polymer composition containing 5 to 70% by weight of hydrophilic groups attached to the polymeric chain, 0.1–50% by weight of an antiseptic, said antiseptic being slightly soluble in water and a solvent for said composition, whereby after said coating composition has dried moisture causes said antiseptic to leach out from said polymer composition.

2. An antiseptic plastic coating composition consisting essentially of a solution of 50–99.9% by weight of at least one water insoluble plastic hydrophilic polymer composition, said polymer containing 5 to 70% by weight hydrophilic groups attached to the polymeric chain, 0.1–50% by weight p-diisobutyl phenoxy ethoxy ethyl dimethyl benzyl ammonium chloride, and a solvent for said composition.

3. An antiseptic plastic coating composition consisting essentially of a solution of 50–99.9% by weight of at least one water insoluble plastic hydrophilic polymer composition, said polymer composition containing 5 to 47% by weight of hydroxyl groups attached to the polymeric chain, 0.1–50% by weight of an antiseptic, said antiseptic being slight soluble in water, and a solvent for said composition, whereby after said coating composition has dried moisture causes said antiseptic to leach out from said polymer composition.

4. An antiseptic plastic coating composition consisting essentially of a solution of 50–99.9% by weight of at least one water insoluble plastic hydrophilic polymer composition, said polymer composition containing 15–45% by weight methoxyl groups attached to the polymeric chain, 0.1–50% by weight of an antiseptic, said antiseptic being slightly soluble in water, and a solvent for said composition, whereby after said coating composition has dried moisture causes said antiseptic to leach out from said polymer composition.

5. An antiseptic plastic coating composition consisting essentially of a solution of 50–99.9% by weight methanol, formaldehyde, and polyhexamethylene adipamide reaction product, 0.1–50% by weight of an antiseptic, said antiseptic being slightly soluble in water, and a solvent for said composition, whereby moisture causes said antiseptic to leach out from said polymer composition.

6. An antiseptic plastic composition consisting essentially of 50–99.9% by weight methanol, formaldehyde, and polyhexamethylene adipamide reaction product, and 0.1–50% by weight p-diisobutyl phenoxy ethoxy ethyl dimethyl benzyl ammonium chloride.

7. A method of protectively coating surfaces which comprises applying a composition onto said surface, said composition consisting essentially of a solution of 50–99.9% by weight of at least one water insoluble plastic hydrophilic polymer composition, said polymer composition containing 5 to 70% by weight hydrophilic groups attached to the polymeric chain, 0.1–50% by weight of an antiseptic, said antiseptic being slightly soluble in water, and a solvent for said composition, and drying said composition to remove said solvent and leave the residue as a coating on said surface, whereby moisture applied to said surface causes said antiseptic to leach out from said polymer composition.

8. An antiseptic plastic coating composition consisting essentially of a solution of 50–99.9% by weight of a polymer composition, said polymer composition comprising at least one plastic hydrophilic polymer containing 5 to 70% by weight hydrophilic groups attached to the polymeric chain, a crosslinking agent capable of reacting with said polymer to render it insoluble in water, said crosslinking agent being selected from the group consisting of formaldehyde, acetaldehyde, glyoxal, dichromates, methylol ureas, citric acid, diisocyanates and melamine formaldehyde complexes, and a solvent for said composition, and 0.1–50% by weight of an antiseptic, said antiseptic being slightly soluble in water, whereby after said coating composition has dried and crosslinked moisture causes said antiseptic to leach out from said polymer composition.

9. A method in accordance with claim 7 wherein the polymer composition is the reaction product of methanol, formaldehyde, and polyhexamethylene adipamide.

10. A method in accordance with claim 7 wherein the antiseptic is p-diisobutyl phenoxy ethoxy ethyl dimethyl benzyl ammonium chloride.

11. A method of protectively coating surfaces which comprises applying a composition onto said surface, said composition consisting essentially of a solution of 50–99.9% by weight of a polymer composition, said polymer composition comprising at least one plastic hydrophilic polymer containing 5 to 70% by weight hydrophilic groups attached to the polymeric chain, a crosslinking agent capable of reacting with said polymer to render it insoluble in water, said cross-linking agent being selected from the group consisting of formaldehyde, acetaldehyde, glyoxal, dichromates, methylol ureas, citric acid, diisocyanates and melamine formaldehyde complexes, and a solvent for said composition, and 0.1–50% by weight of an antiseptic, said antiseptic being slightly soluble in water, and drying said composition to remove said solvent and leave the residue as a crosslinked polymeric coating on said surface, whereby moisture applied to said surface causes said antiseptic to leach out from said polymer composition.

References Cited in the file of this patent

UNITED STATES PATENTS

| | | |
|---|---|---|
| 2,112,412 | Wetchler | Mar. 29, 1938 |
| 2,282,181 | Guinzberg | May 5, 1942 |
| 2,429,404 | Dixon et al. | Oct. 21, 1947 |
| 2,491,287 | Smith et al. | Dec. 13, 1949 |
| 2,558,042 | Cornwell | June 26, 1951 |

UNITED STATES PATENT OFFICE
Certificate of Correction

Patent No. 2,951,766                                        September 6, 1960

Le Roy A. White

It is hereby certified that error appears in the above numbered patent requiring correction and that the said Letters Patent should read as corrected below.

Column 3, line 45, insert formula

lines 68 to 71, strike out formula

column 4, lines 69 to 75, the formula should appear as shown below instead of as in the patent:

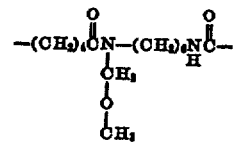

column 6, line 44, for "methnol" read —methanol—.

Signed and sealed this 30th day of May 1961.

[SEAL]

Attest:
ERNEST W. SWIDER,
*Attesting Officer.*

DAVID L. LADD,
*Commissioner of Patents.*